June 16, 1931.  P. F. SHARP  1,810,682
METHOD OF PREPARING LACTOSE
Filed Dec. 4, 1929
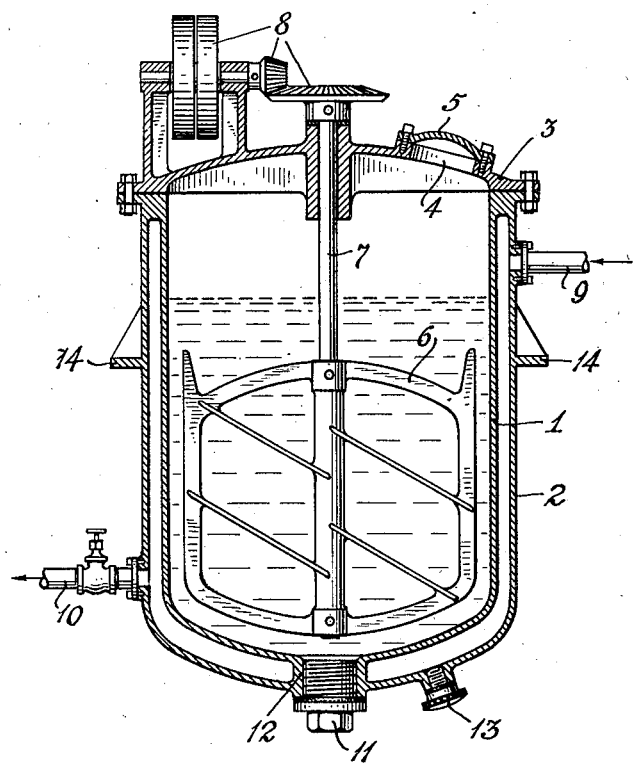
WITNESS
INVENTOR
PAUL FRANCIS SHARP
BY
ATTORNEYS Patented June 16, 1931

1,810,682

UNITED STATES PATENT OFFICE

PAUL FRANCIS SHARP, OF ITHACA, NEW YORK, ASSIGNOR TO CORNELL UNIVERSITY, OF ITHACA, NEW YORK, AN EDUCATIONAL CORPORATION OF NEW YORK

METHOD OF PREPARING LACTOSE

Application filed December 4, 1929. Serial No. 411,465.

Lactose, more commonly known as milk-sugar, exists in two forms, known respectively as alpha lactose and beta lactose, the former having two sub-species, the hydrous and the anhydrous. The dry lactose of commerce consists of the hydrous alpha form and is of comparatively low solubility at ordinary temperatures, whereas beta lactose is of higher solubility than the alpha form at ordinary temperatures. Lactose having substantially the beta form only has commercial advantages far in excess of the alpha form. It is much more readily soluble than the latter and, possibly, because of its higher solubility, has a sweeter taste, and for many uses it would be more desirable than cane sugar. Its greater solubility enables larger quantities thereof to be administered in solution in a given body of water to patients suffering from certain ailments for which lactose, especially in combination with certain milk preparations, is deemed an efficient remedy.

If alpha lactose is brought into solution, for instance, with water, a certain proportion of it will, within a comparatively short time, be converted into beta lactose, the proportion so converted depending upon the temperature of the solvent; the rapidity with which such conversion takes place depending also upon the temperature of the solvent. Beta lactose in solution will similarly, in part, be converted into alpha lactose. In either case the result at a given temperature will be the same, that is, the proportion of alpha lactose to beta lactose will be the same whether the original solute was alpha lactose or was beta lactose, and when the conversion has been completed the lactose solution is said to be in equilibrium.

It is known that lactose will crystallize out of water solution either in the alpha form or in the beta form, depending upon the temperature at which the solution is maintained during the crystallization stage. Other things being equal, alpha lactose will crystallize out at lower temperatures and beta lactose at higher temperatures; and the degree of temperature above which the latter, and below which the former, will crystallize out is known in the chemical literature of lactose as the "transition point". This point lies at approximately 93° C., but may vary under different conditions. Some of these conditions are well known to those skilled in the art. One condition, which I have discovered in connection with a process which forms the subject-matter of a separate application for United States Letters Patent, is that in the presence of a substantially large amount of crystals of beta lactose and in the absence of any substantial proportion of crystals of alpha lactose, beta lactose crystals may be produced by heating a saturated solution of lactose at temperatures much lower than 93° C., in fact, as low as 83° C. and in some cases as low as 78° C.

I have found that beta lactose crystals may be obtained in commercial quantities without substantial admixture of alpha lactose crystals by crystallization from lactose solution in the presence of undissolved alpha lactose, if the temperature of such solution is maintained above the transition point in a closed vessel, such as an autoclave, or under such other conditions that none of the solvent, or substantially none of the solvent, is lost by evaporation, and by subsequent separation of the mother liquor from the crystals under conditions which will not permit the formation of substantial quantities of alpha crystals.

The lactose solution is initially in a condition of equilibrium, i. e., it contains such proportion of alpha lactose and beta lactose as is normal for the temperature of the solution. At higher temperatures, and more particularly at temperatures above the transition point, the solution becomes supersaturated with respect to beta lactose, and I have found that if, under such conditions, an excess of alpha lactose is present, such excess will go into solution and beta lactose will go out of solution, the latter in the form of crystals. As the crystals of beta lactose form and separate out of solution the equilibrium of the solution is disturbed but it is immediately restored by the conversion of some of the dissolved alpha lactose into beta lactose, which latter in turn crystallizes and separates out of solution, as more alpha lactose goes into solution. The solution remains substantially at all times at the concentration normal for its temperature and the process continues until all of the excess alpha lactose has gone into solution. When the process stops there will then be present in the vessel the magma composed of beta lactose crystals and the mother liquor consisting of a solution of alpha and beta lactose in equilibrium. If now the crystals are separated from the mother liquor, for instance, by means of a centrifugal dryer, under conditions which will not permit the formation of alpha lactose crystals, the crystalline mass will consist of beta lactose crystals only, or of beta lactose crystals containing only an insignificant proportion of alpha lactose crystals, depending upon the degree to which unfavorable conditions have been avoided. During the transfer and the drying operation the temperature need not be maintained above the "transition point" as heretofore understood by chemists, namely in the neighborhood of 93° C., if the process has been so carefully conducted that alpha crystals have not been permitted to form to such an extent and in such a manner as to seed the solution with alpha nuclei but, of course, this operation must not be conducted at so low a temperature and/or so slowly as to permit such alpha crystals to form, in substantial quantities. The beta crystals may be washed with water to remove the last traces of mother liquor, and may then be dried by the application of heat. In the laboratory experiments made by me I have been able to wash the beta crystals with cold water without conversion of a substantial proportion of such crystals into alpha lactose.

As a saturated solution of lactose is very viscous, it is advisable to have the free alpha intimately mixed with the initial solution in order that the process may proceed with speed until all of the free alpha lactose has gone into solution. The free alpha lactose may be thoroughly mixed with a suitable solvent, such as water, before it is placed into the vessel, or it may be mixed with such solvent in the vessel. In either case it is advisable, although not essential, to provide means for stirring the viscous solution during the operation of the process.

It is obvious that the solvent, or, at any rate, a substantial proportion thereof, should not be permitted to escape from the vessel and I therefore conduct the process preferably in a closed vessel, such as an autoclave, which will permit me to maintain the solution at a comparatively high temperature, but I may conduct the process in an open vessel with the aid of a reflux condenser which will automatically return any evaporated solvent, in which case it may be advantageous to seed with beta lactose crystals. If, however, my process is worked under conditions which permit an escape of solvent, solvent may be added to replace the lost solvent, and when I speak in my claims of keeping the quantity of solvent substantially constant, I include as an obvious equivalent the replacement of any solvent that may have been lost.

In the drawing forming part of this specification I have illustrated a form of autoclave suitable for use in carrying out my process. Any other suitable apparatus may be used and I do not claim any novelty for the apparatus shown in the drawing. 1 represents a container, 2 a jacket therefor, 3 a cover for the container having an aperture 4 closed by cover 5; 6 represents a stirrer of any suitable construction turned by means of a shaft 7 revolved by any suitable means such as beveled gears and pulley assembly 8; 9 is a pipe through which a suitable heating medium, such as steam, may be conducted into the space between the container 1 and jacket 2; 10 is a valved pipe through which air or other heating medium present in such space may be permitted to escape; 11 is a plug closing an opening 12 through which the magma referred to may be removed after the completion of the process; 13 is a drain plug closing an aperture through which condensed steam may be withdrawn from the space between the container and jacket; 14—14 are projections or lugs by means of which the autoclave may be suspended in the usual manner. An ordinary pressure gauge and/or thermometer may be applied to the apparatus to indicate the pressure and temperature within the autoclave.

*Example*

2000 grams of hydrous alpha lactose (the ordinary lactose of commerce) are gradually and thoroughly mixed with 450 cc. of water in an autoclave such as shown in the drawing, while steam is introduced between the vessel and the jacket and maintained at a pressure of 30 pounds. The mixture of the resulting solution and excess lactose is gently stirred by means of the stirring mechanism in the autoclave and the autoclave is closed. After the last of the free alpha has gone into solution, the steam is turned off and the magma allowed to cool to below 100° C. so that the autoclave may conveniently be opened, but preferably not below the transition point.

The magma is then removed from the autoclave and poured into a rapidly revolving centrifugal basket of a centrifuge preferably previously heated to a temperature well above the transition point. After the mother liquor has been separated from the crystals, the latter are washed in a small amount of tap water while the centrifuge is in rapid motion, and the centrifuge is allowed to run for about five minutes after washing has stopped. The crystals are then removed from the centrifuge and dried in the air. A yield of 978 grams of 99+%, i. e. almost pure, beta lactose, is obtained.

In the above process as operated by me, the pressure within the autoclave 15 minutes after the steam was turned on was seven pounds, and the temperature 115° C. The pressure within the autoclave gradually rose to ten pounds and the temperature to 119° C. within the next eleven minutes. The steam was then shut off and thirty-four minutes later the pressure had dropped to zero and the temperature to 96° C., at which point the magma was removed from the autoclave.

It is obvious that no more water should be used than reasonably necessary for carrying out the process, so that at the completion of the process no more unconverted alpha lactose and no more beta lactose remain in solution than necessary. In the above example 375 cc. of cold water would have been sufficient if the autoclave had been closed before the water was brought to the boiling point by steam introduced between the vessel and the jacket. I prefer, however, to heat the water while mixing it with alpha lactose as the mixture can be more readily stirred when the water is hot. As a substantial amount of water is lost by evaporation when operating in the manner described in the above example (i. e. during the initial mixing operation and before the autoclave is closed) suitable allowance has to be made for such loss.

If it is desired to have the crystals of beta lactose of comparatively large size, the temperature of the solution may be raised to a much higher degree than the 119° referred to in the example, or the temperature may be lowered and raised several times during the operation, or the material may be held at the high temperature for some time before beginning the cooling process.

The time within which the excess alpha lactose goes completely into solution may readily be determined, for a batch of any particular volume and constitution, by trial with experimental batches.

While my invention contemplates the production of beta lactose crystals substantially free from admixture with alpha lactose crystals, I desire it to be understood that stopping my process before all of the excess alpha lactose has gone into solution, or so conducting the drying operation that substantial quantities of alpha lactose crystals are permitted to form, would not depart from the spirit of my invention and would result in a product which, while not as useful as the product of my process, might nevertheless have some value.

I claim:

1. The process of producing beta lactose crystals substantially free from admixture with alpha lactose crystals, which comprises heating a saturated solution of lactose above the transition point in the presence of undissolved alpha lactose, while maintaining the quantity of the solvent substantially constant, until all of the alpha lactose has gone into solution.

2. The process of producing beta lactose crystals substantially free from admixture with alpha lactose crystals, which comprises heating in a closed vessel a saturated solution of lactose above the transition point in the presence of undissolved alpha lactose, until all of the alpha lactose has gone into solution.

PAUL FRANCIS SHARP.